US008572375B2

(12) United States Patent
Bishop et al.

(10) Patent No.: US 8,572,375 B2
(45) Date of Patent: Oct. 29, 2013

(54) DEVICE PAIRING BASED ON GRAPHICALLY ENCODED DATA

(75) Inventors: Alan G. Bishop, Campbell, CA (US); Eric R. Soldan, Saratoga, CA (US)

(73) Assignee: Microsoft Corporation, Redmond, WA (US)

( * ) Notice: Subject to any disclaimer, the term of this patent is extended or adjusted under 35 U.S.C. 154(b) by 323 days.

(21) Appl. No.: 12/565,578

(22) Filed: Sep. 23, 2009

(65) Prior Publication Data

US 2011/0072263 A1    Mar. 24, 2011

(51) Int. Cl.
*H04L 9/32* (2006.01)

(52) U.S. Cl.
USPC ............................................. 713/168

(58) Field of Classification Search
USPC ................... 713/168, 171, 176; 705/14.64; 455/41.1; 726/5
See application file for complete search history.

(56) References Cited

U.S. PATENT DOCUMENTS

| | | | |
|---|---|---|---|
| 2004/0253923 A1 | 12/2004 | Braley et al. | |
| 2006/0135064 A1* | 6/2006 | Cho et al. | 455/41.1 |
| 2007/0123166 A1 | 5/2007 | Sheynman et al. | |
| 2007/0300063 A1* | 12/2007 | Adams et al. | 713/168 |
| 2008/0092043 A1* | 4/2008 | Trethewey | 715/705 |
| 2008/0268776 A1 | 10/2008 | Amendola | |
| 2010/0306060 A1* | 12/2010 | Yancey et al. | 705/14.64 |

FOREIGN PATENT DOCUMENTS

EP    1578093 A1    9/2005

OTHER PUBLICATIONS

Saxena, et al., "Secure Device Pairing based on a Visual Channel", Retrieved at <<http://eprint.iacr.org/2006/050.pdf>>, pp. 1-17.
Tsudik, Gene, "Secure Device Pairing", Retrieved at <<http://www.eurecom.fr/teaching/engineering/page40379/file40063.pdf>>, pp. 50.
Saxena, et al., "Universal Device Pairing using an Auxiliary Device", Retrieved at <<http://cups.cs.cmu.edu/soups/2008/proceedings/p56Saxena.pdf>>, Symposium on Usable Privacy and Security (SOUPS) 2008, Jul. 23-25, 2008, Pittsburgh, PA, USA, pp. 12.
McCune, et al., "Seeing-Is-Believing: Using Camera Phones for Human-Verifiable Authentication", Retrieved at <<http://reports-archive.adm.cs.cmu.edu/anon/2004/CMU-CS-04-174.pdf>>, Nov. 2004, pp. 22.
Im, Seunghyun, "Validating Secure Connections between Wireless Devices in Pervasive Computing Using Data Matrix", Retrieved at <<http://ieeexplore.ieee.org/stamp/stamp.jsp?arnumber=04505718, 2008 International Conference on Multimedia and Ubiquitous Engineering, 2008, IEEE, pp. 186-190.

\* cited by examiner

*Primary Examiner* — Samson Lemma
(74) *Attorney, Agent, or Firm* — Wolfe-SBMC

(57) ABSTRACT

In a computing device, both an address of a first device and a secret are graphically encoded to generate one or more images that can be captured by a second device. The second device captures and decodes the one or more images, and sends a communication initiation request to the address of the first device. The communication initiation request includes the address of the second device and identifies the secret. Communication between the first and second device continues only if the first device verifies, based on the communication initiation request, that the second device knows the secret.

18 Claims, 6 Drawing Sheets

DEVICE PAIRING BASED ON GRAPHICALLY ENCODED DATA

BACKGROUND

As technology has advanced, computing devices have become increasingly present in people's lives. Given the widespread usage of such devices, users oftentimes desire two devices to be able to communicate data and/or control information between one another. Current communication techniques, however, oftentimes involve a wired connection between the two devices, and/or numerous settings or other configuration changes being made by the users of the devices. Furthermore, if the users desire that the communication between the two devices be secure, current communication techniques oftentimes require the users to take additional steps to ensure that the communication between the two devices be kept secure. These communication techniques, however, can be time consuming and cumbersome on the part of the user, reducing the user friendliness of the devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, in a computing device both an address of a first device and a first secret are graphically encoded to generate one or more images that can be captured by a second device. A communication initiation request is received from the second device and, based on the communication initiation request, the second device knowing the first secret is verified. The computing device communicates with the second device only if the second device is verified as knowing the first secret.

In accordance with one or more aspects, in a first device one or more images displayed by a second device are captured. Both an address and a secret are decoded from the one or more images, and a communication initiation request identifying the secret is sent to the address. The first device continues communicating with the second device only if a confirmation of the communication initiation request is received.

BRIEF DESCRIPTION OF THE DRAWINGS

The same numbers are used throughout the drawings to reference like features.

DETAILED DESCRIPTION

Device pairing based on graphically encoded data is discussed herein. A secret is generated and both an address of a first device as well as the secret are graphically encoded by the first device and displayed for capture by a second device. An image capture component of the second device captures the graphically encoded address and secret (which is now shared by the two devices), and decodes the address and secret. The second device then sends a communication initiation request to the first device using the decoded address. As part of the communication initiation request, the second device includes an indication of an address of the second device, and also includes proof that the second device has knowledge of the secret. The first device receives the communication initiation request and verifies that the second device has knowledge of the secret. If the second device is verified as having knowledge of the secret, then the first and second devices proceed to communicate with one another; otherwise, the first and second devices do not proceed to communicate with one another.

References are made herein to symmetric key cryptography, public key cryptography and public/private key pairs. Although such key cryptography is well-known to those skilled in the art, a brief overview of such cryptography is included here to assist the reader. In public key cryptography, an entity (such as a user, hardware or software component, a device, a domain, and so forth) has associated with it a public/private key pair. The public key can be made publicly available, but the entity keeps the private key a secret. Without the private key it is computationally very difficult to decrypt data that is encrypted using the public key. So, data can be encrypted by any entity with the public key and only decrypted by an entity with the corresponding private key. Additionally, a digital signature for data can be generated by using the data and the private key. Without the private key it is computationally very difficult to create a signature that can be verified using the public key. Any entity with the public key can use the public key to verify the digital signature by executing a suitable digital signature verification algorithm on the public key, the signature, and the data that was signed.

In symmetric key cryptography, on the other hand, a symmetric key is known by and kept secret by the two entities. Any entity having the symmetric key is typically able to decrypt data encrypted with that symmetric key. Without the symmetric key it is computationally very difficult to decrypt data that is encrypted with the symmetric key. So, if two entities both know the symmetric key, each can encrypt data that can be decrypted by the other, but other entities cannot decrypt the data if the other entities do not know the symmetric key.

Figure 1:
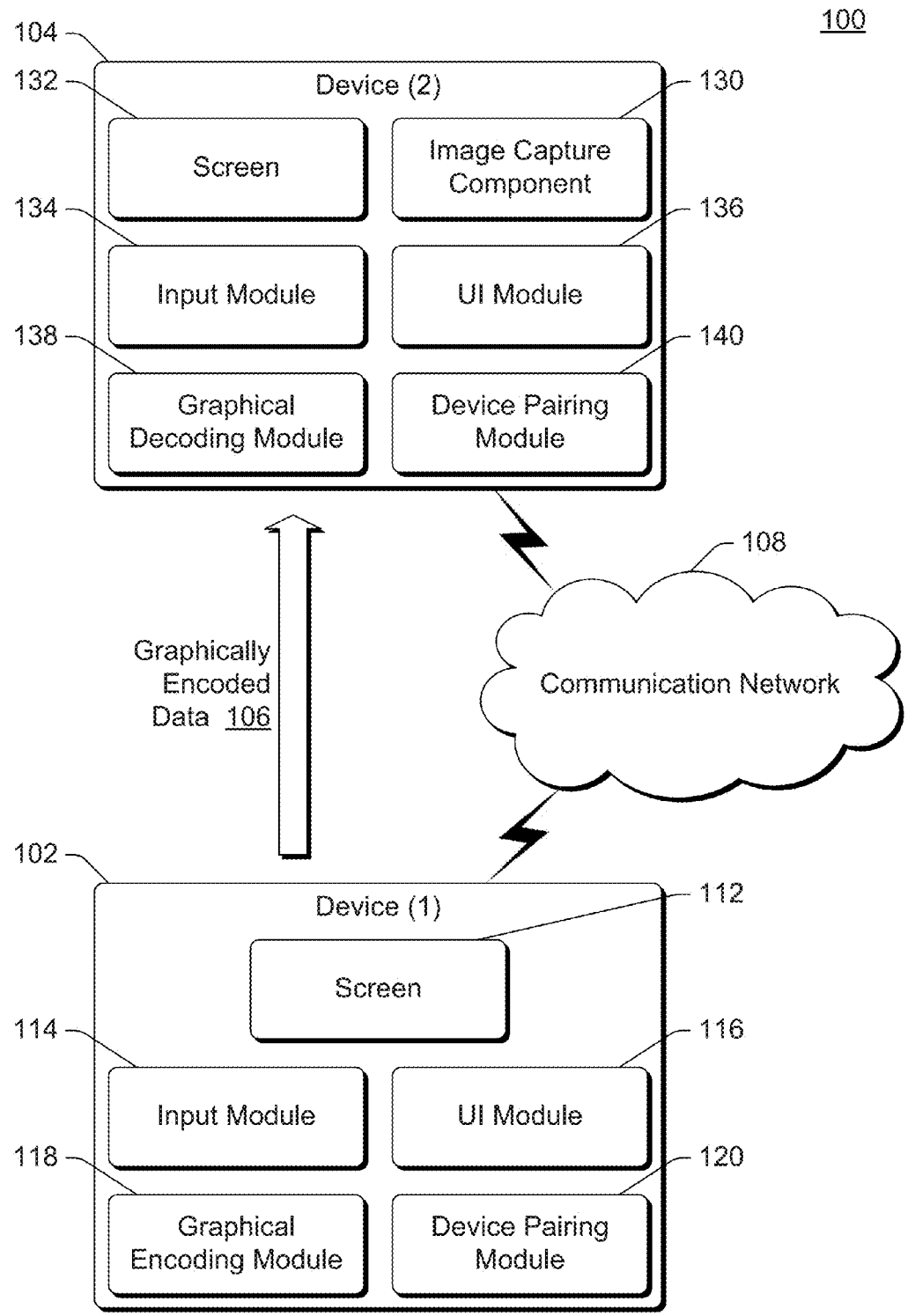
FIG. 1 illustrates an example system implementing the device pairing based on graphically encoded data in accordance with one or more embodiments.

FIG. 1 illustrates an example system 100 implementing the device pairing based on graphically encoded data in accordance with one or more embodiments. System 100 includes a device 102 and a device 104. Each of devices 102 and 104 can be a variety of different types of devices. For example, each of device 102 and device 104 can be a desktop computer, a server computer, a netbook, a handheld computer, a personal digital assistant (PDA), a mobile station, an entertainment appliance, a set-top box communicatively coupled to a display device, a cellular or other wireless phone, a game console, an automotive computer, and so forth. Thus, each of devices 102 and 104 may range from a full resource device with substantial memory and processor resources (e.g., personal computers, game consoles) to a low-resource device with limited memory and/or processing resources (e.g., traditional set-top boxes, hand-held game consoles). Devices 102 and 104 can be the same type of device, or alternatively different types of devices.

Graphically encoded data 106 can be transferred from device 102 to device 104. Accordingly, device 102 can also be referred to as a source device, and device 104 can also be referred to as a recipient device. Graphically encoded data is data that has been encoded using one or more graphical encoding techniques, resulting in one or more images that can be graphically decoded to obtain the encoded data. Although system 100 is discussed with reference to device 102 including modules supporting graphically encoding data and device 104 including modules supporting graphically decoding data, it is to be appreciated that device 104 can also include modules supporting graphically encoding data, and/or device 102 can also include modules supporting graphically decoding data.

Although not illustrated in FIG. 1, devices 102 and 104 can also include various additional modules or components, including one or more applications that are run by one or more processors of device 102 or 104. A variety of different types of modules or applications can be included in a device 102 or 104, such as communications applications or modules for wirelessly sending data to and/or receiving data from other devices, productivity applications or modules (e.g., spreadsheets, word processors), recreational applications or modules (e.g., games), resource applications or modules (e.g., databases, digital books), audio/video applications or modules (e.g., digital cameras, digital video cameras, music playback programs), mapping or tracking applications or modules, and so forth.

Communication network 108 allows device 102 to communicate with one another. Communication network 108 can be a variety of different networks, including the Internet, a local area network (LAN), a public telephone network, an intranet, other public and/or proprietary networks, combinations thereof, and so forth. Communication between devices 102 and 104 is initiated by device 102 notifying device 104, using graphically encoded data 106, of an address of device 102. This address identifies device 102 on communication network 108. Given this address (and optionally other information regarding the location of device 102), other devices on network 108 can send messages to device 102. Device 104 can use the address (and optionally other information regarding the location of device 102) to notify device 102 of an address of device 104 (which identifies device 104 on communication network 108). Given this address (and optionally other information regarding the location of device 104), other devices on network 108 can send messages to device 104. This initiation of communication is also referred to as pairing devices 102 and 104 because devices 102 and 104 are paired together and able to communicate with one another after the initiation process.

Device 102 includes a screen 112, an input module 114, a user interface (UI) module 116, a graphical encoding module 118, and a device pairing module 120. Each of modules 114, 116, 118, and 120 can be implemented in software, firmware, hardware, or combinations thereof. When implemented in software or firmware, such a module includes one or more instructions that are executed by one or more processors or controllers of device 102.

Screen 112 is a display component of device 102. Screen 112 can be implemented in a variety of different manners, such as using liquid crystal display (LCD) technology, plasma screen technology, image projection technology, and so forth. Alternatively, rather than including screen 112, screen 112 can be separate from device 102 and device 102 can generate one or more signals that are output to one or more other display devices that include screen 112.

Input module 114 receives user inputs from a user of device 102. User inputs can be provided in a variety of different manners, such as by pressing a particular portion of a touchpad or touchscreen of device 102, by entering one or more gestures (e.g., particular shapes or patterns) on a touchpad or touchscreen of device 102, or pressing one or more keys of a keypad or keyboard of device 102. Touchscreen functionality can be provided using a variety of different technologies, such as through capacitive, surface acoustic wave, resistive, optical, strain gauge, dispersive signals, acoustic pulse, or other touchscreen technologies. The user input can also be provided in other manners, such as via audible inputs, other physical feedback input to the device (e.g., tapping any portion of device 102 or another action that can be recognized by a motion detection component of device 102, such as shaking device 102, rotating device 102, etc.), and so forth.

UI module 116 generates, manages, and/or outputs a user interface for display on screen 112. This user interface displays various information on screen 112, and user inputs can be received by input module 114 as discussed above. UI module 116 can display, for example, images generated by applications or modules of device 102, messages sent by device 102 to other devices, messages received by device 102 from other devices, and so forth.

Graphical encoding module 118 graphically encodes data to be transferred from device 102 to device 104 as graphically encoded data 106, which is used to initiate communication between devices 102 and 104 as discussed in more detail below. Module 118 can graphically encode data using a variety of different graphical encoding techniques. In one or more embodiments, module 118 generates a barcode, such as a high capacity color barcode (HCCB), a QR barcode, other one-dimensional or multi-dimensional barcodes, and so forth. Alternatively, module 118 can graphically encode data using a variety of other techniques that result in an image that can be graphically decoded to obtain the data encoded in the image.

Device pairing module 120 manages, for device 102, the pairing of or initiation of communication between devices 102 and 104. Device pairing module 120 obtains data including both an address of device 102 and a secret. The address of device 102 can be a variety of different identifiers or information that identifies device 102 on communication network 108. Additional location information can also optionally be used by other devices on communication network 108 to, in conjunction with the address, determine how to communicate with device 102. The address of device 102 can vary based on the protocol used by communication network 108. In one or more embodiments, the address of device 102 is an IP (Internet Protocol) address, such as an IPv4 or IPv6 address. The address of device 102 can be obtained by device pairing module 120 in a variety of different manners, such as from another component or module of device 102, from a setting or configuration store of device 102, and so forth.

The secret is a value that is intended to be known to only device 102 and device 104, thus allowing devices 102 and 104 to know they are being paired with each other rather than with some other device. In one or more embodiments, the secret is a string of characters such as numbers and/or letters. Alternatively, the secret can be other characters, symbols, and so forth. The secret can be a cryptographic key, or alternatively another string of characters, symbols, etc.

Device pairing module 120 can obtain the secret in a variety of different manners. In one or more embodiments, module 120 generates a random number or other string of characters that is used as the secret. In other embodiments, module 120 obtains the secret from another component or module of device 102.

Device pairing module 120 provides both the obtained address of device 102 and the secret to graphical encoding module 118. Graphical encoding module 118, in turn, graphically encodes the obtained address and secret to generate one or more images. Device pairing module 120 can also optionally provide additional location information regarding device 102 to graphical encoding module 118, which encodes the additional location information in the one or more images. Module 118 can encode both the obtained address and the secret into the same image, or alternatively can encode the obtained address and/or the secret across multiple images as discussed in more detail below. These one or more images are then displayed on screen 112. The display of these one or more images on screen 112 can be managed by UI module 116, graphical encoding module 118, device pairing module 120, or alternatively another module of device 102. These images displayed on screen 112 are the graphically encoded data 106 being transferred to device 104.

The amount of time the one or more images are displayed on the screen can vary. In one or more embodiments, the amount of time the one or more images are displayed is time-based. For example, the one or more images can be displayed for a specific amount of time (e.g., 15 seconds, 30 seconds, etc.). In other embodiments, the amount of time the one or more images are displayed is based on some other event. For example, the one or more images can be displayed until a communication initiation request is received from another device (e.g., device 104), as discussed in more detail below.

The images encoding the address and secret are generated and can be displayed in response to a variety of different events or actions. For example, the images can be generated and displayed in response to device 102 being powered on. Alternatively, the images can be generated and displayed in response to a user request or a request from another component, module, device. For example, the images can be generated and displayed in response to a device pairing request input by a user via input module 134, such as by user selection of a "device pairing" button or menu item, tapping device 104, entering a particular gesture, and so forth.

Figure 2:
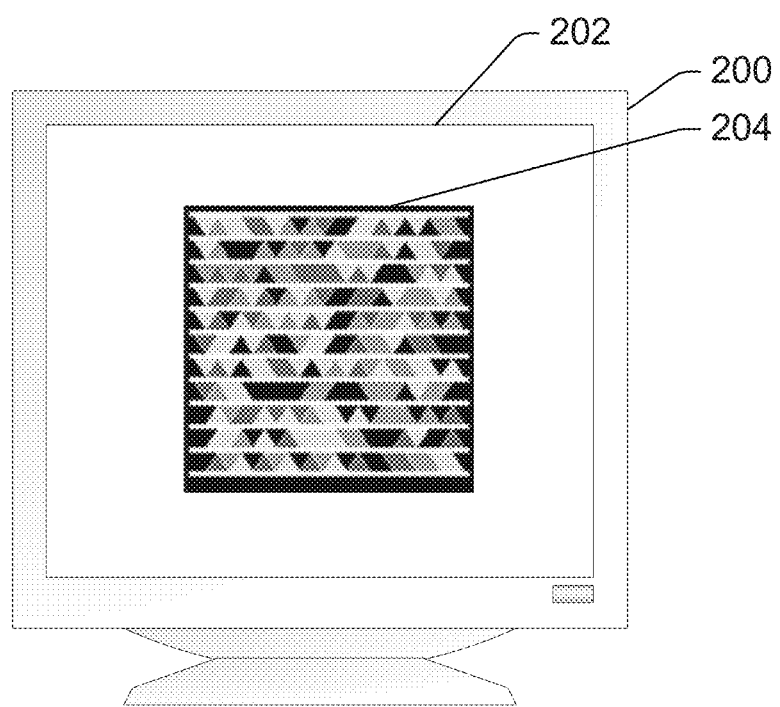
FIG. 2 is a diagram illustrating an example screen display of a device in accordance with one or more embodiments.

FIG. 2 is a diagram illustrating an example screen display of a device 200 in accordance with one or more embodiments. Device 200 can be, for example, a device 102 of FIG. 1. Device 200 includes a screen 202 on which an image 204 is displayed. The image is a graphically encoded address and secret (e.g., as obtained by device pairing module 120 as discussed above). Although illustrated as a non-colorized image, it is to be appreciated that image 210 can include various colors (e.g., as an HCCB image).

Returning to FIG. 1, device 104 includes an image capture component 130, a screen 132, an input module 134, a UI module 136, a graphical decoding module 138, and a device pairing module 140. Each of modules 134, 136, 138, and 140 can be implemented in software, firmware, hardware, or combinations thereof. When implemented in software or firmware, such a module includes one or more instructions that are executed by one or more processors or controllers of device 102. Alternatively, device 104 need not include one or more of screen 132, component 130, and/or one or more modules 134-140. For example, device 104 may not include screen 132 or input module 134.

Screen 132 is a display component of device 104 (or a separate display device), analogous to screen 112 of device 102. Input module 134 receives inputs from a user of device 104, analogous to input module 114 of device 102. UI module 136 generates, manages, and/or outputs a user interface for display on screen 132, analogous to UI module 116 of device 102.

Image capture component 130 captures images for use by device 104, including images displayed on screen 112. Image capture component 130 can also be referred to as a camera or digital camera. A variety of different technologies can be used to implement image capture component 130, such as CCD (charge coupled device) technology, CMOS (complementary metal oxide semiconductor) technology, and so forth. Although illustrated as being part of device 104, alternatively component 130 can be a separate device (e.g., a camera coupled to device 104).

Image capture component 130 can determine when to capture an image displayed by device 102 on screen 112 in a variety of different manners. In one or more embodiments, the image is captured by component 130 in response to a capture request input by a user via input module 134, such as by user selection of a "capture" button or menu item, user selection of a "device pairing" button or menu item, tapping device 104, entering a particular gesture, and so forth. This allows the user of device 104 to position device 104 appropriately so that screen 112 is in view of a lens or other opening of device 104, allowing component 130 to capture the image displayed on screen 112. For example, device 104 can switch to a camera mode in response to a user request (e.g., a user request to pair device 104 with another device), displaying on screen 132 a view being seen by image capture component 130. The user can then position device 104 appropriately so that the image on screen 112 is being seen by image capture component 130, and then input a capture request.

Alternatively, the user of device 104 can enter a request to pair device 104 with another device, in response to which component 130 begins capturing images at regular or irregular intervals until one or more images that graphically encode data are captured. Device 104 can distinguish images that graphically encode data from images that do not graphically encode data in different manners, such as based on a known signature or other value encoded into each graphically encoded image by module 118.

In other alternatives, component 130 can begin capturing images at regular or irregular intervals in response to some other request or event rather than a user request to pair device 104 with another device. For example, component 130 can begin capturing images when device 104 is powered on, when image capture component 130 is powered on, and so forth. Component 130 continues capturing the images until one or more images that graphically encode data are captured or alternatively some other event occurs (e.g., after a threshold amount of time has passed or a threshold number of images are captured).

Graphical decoding module 138 graphically decodes data transferred from device 102. Module 138 can graphically decode data using a variety of different graphical decoding techniques. The particular technique used by module 138 depends on the particular graphical encoding technique used by graphical encoding module 118 of device 102 to encode the data. In one or more embodiments, graphical encoding module 118 and graphical decoding module 138 are configured with or otherwise aware of the particular graphical encoding technique being used, and module 138 can thus readily decode data encoded by module 118. Alternatively, graphical decoding module 138 can automatically detect the particular graphical encoding technique being used in a variety of different manners. For example, module 138 can determine the graphical encoding technique being used based on characteristics of the image (e.g., whether the image is black and white or includes color, whether symbols in the image are triangles or other shapes, etc.) in which the data is encoded.

By way of another example, module 138 can determine the graphical encoding technique being used based on an identifier encoded in the image (e.g., a particular portion of the image that decodes to a particular value for a particular graphical encoding technique). Module 138 can decode the image assuming the image was encoded using one graphical encoding technique and check whether the particular portion decodes to the particular value—if the particular portion decodes to the particular value then module 138 knows that one graphical encoding technique was used to encode the image, otherwise module 138 can repeatedly select different graphical encoding techniques until the particular portion decodes to the particular value.

Graphical pairing module 140 manages, for device 104, the pairing or initiation of communication between devices 102 and 104. The images displayed on screen 112 as graphically encoded data 106 are captured by image capture component 130 and provided to graphical decoding module 138. Graphical decoding module 138 decodes the data encoded in the images and provides the decoded data to graphical pairing module 140.

Device pairing module 140 receives this decoded data, which is the address of device 102 and the secret. As both device 102 and 104 now have the secret, this secret is also referred to as a shared secret. Additional location information regarding device 102 can also be included in the decoded data as discussed above. Based on this decoded data, device pairing module 140 generates a communication initiation request that targets (e.g., is addressed to) device 102. The address of device 102 is known given the decoded data. Device pairing module 140 also generates the communication initiation request identifying the secret to prove that device 104 has knowledge of the secret that was obtained by device pairing module 120 as discussed above. Device pairing module 140 can generate the communication initiation request to prove it has knowledge of the secret in a variety of different manners. For example, device pairing module 140 can include the secret in unencrypted form in the communication initiation request. By way of another example, a variety of different conventional encryption techniques and/or secure communication techniques can be used by device 104 to inform, in a secure manner, device 102 that device 104 has knowledge of the secret.

Additionally, device pairing module 140 also includes in the communication initiation request, an address of device 104. Additional location information can also optionally be included in the communication initiation request to allow other devices on communication network 108 to, in conjunction with the address, determine how to communicate with device 102. This address of device 104 can be a variety of different information (such as an IP address), analogous to the address of device 102 discussed above.

Device pairing module 140 sends the communication initiation request to device 102. At device 102 in response to the communication initiation request, device pairing module 120 obtains the secret from the communication initiation request. The particular manner in which the secret is obtained from the communication initiation request is dependent on the manner in which device pairing module 140 generated the communication initiation request to prove it has knowledge of the secret. For example, the secret can be retrieved in unencrypted form from the communication initiation request, or can be retrieved from or obtained based on the communication initiation request using a variety of different conventional encryption techniques and/or secure communication techniques.

Device pairing module 120 verifies that the communication initiation request proves that device 104 has knowledge of the secret. This verification can be performed in a variety of different manners and is dependent on the particular encryption techniques and/or secure communication techniques (if any) used by device pairing module 140.

After device pairing module 120 verifies that the communication initiation request proves that device 104 has knowledge of the secret, device pairing module 120 can proceed with communicating with device 104. The communication initiation request includes an address of device 104 as discussed above (and optionally other location information), and device pairing module 120 can return a confirmation message to device 104 notifying device 104 that device 104 has been confirmed as having knowledge of the secret key. Devices 102 and 104 are now aware of each other's addresses (e.g., IP addresses) and optionally other location information, and can proceed with communicating with one another, sending messages including data, control information, and so forth to one another. It is also to be appreciated that various conventional encryption and/or secure communication techniques can optionally be used to provide secure communication between devices 102 and 104.

It is to be appreciated that, by including the secret in graphically encoded data 106, devices 102 can be assured that the only devices having knowledge of the secret are those devices that are able to capture the image displayed on screen 112. Accordingly, a malicious device that accesses communication network 108 would not be able to provide a verifiable communication initiation request to device 102 claiming to be device 104 because such a malicious device would not have the secret that was encoded in the displayed image.

It should be noted that graphical encoding module 118 can alternatively generate multiple images for display on screen 112, encoding the address of device 102 and/or the secret across multiple images. The multiple images are then displayed (individually or concurrently) on screen 112. Component 130 of device 104 captures the multiple images, decodes each image, and then re-assembles the data.

The proper sequence of the multiple images can be encoded in one or more of the images so that the data can be re-assembled in the proper order. By encoding the proper sequence in one or more of the images, the images need not be displayed by device 102 and captured by device 104 in any particular order. Alternatively, no indication of the proper sequence may be encoded in the images; rather, device 104 relies on the images being displayed by device 102 in the proper order so that the data can be properly re-assembled.

In one or more embodiments, each of the multiple images has encoded in it an indication of which portion that image is (e.g., the first portion, the second portion, the third portion, etc.). In other embodiments, one or more of the multiple images has encoded in it an indication of the sequence of the images. For example, a single image can have a listing of the ordering of the images, with the different images being identified in the listing with identifiers that are encoded in each of the multiple images, with signatures of the images, with particular portions of the images that allow the different images to be distinguished from one another, and so forth. In other embodiments, an indication of the sequence of images can be encoded as an individual image rather than being encoded with a portion of the data being copied.

Device 102 can display the multiple images in different manners. For example, device 102 can display each of the multiple images for an amount of time, then automatically switch to displaying a next one of the multiple images, continuing until all of the multiple images have been displayed. The multiple images can each be displayed once, or alternatively can be cycled through and displayed multiple times. By way of another example, device 102 can display an image until a user request is received via input module 114 to display another of the multiple images. The user request is input, for example, after the image has been captured by device 104.

Device 104 can similarly capture the multiple images in different manners. For example, device 104 can automatically capture images as they are displayed on screen 112, or alternatively capture images in response to a user request to capture an image input via input module 134.

Figure 3:
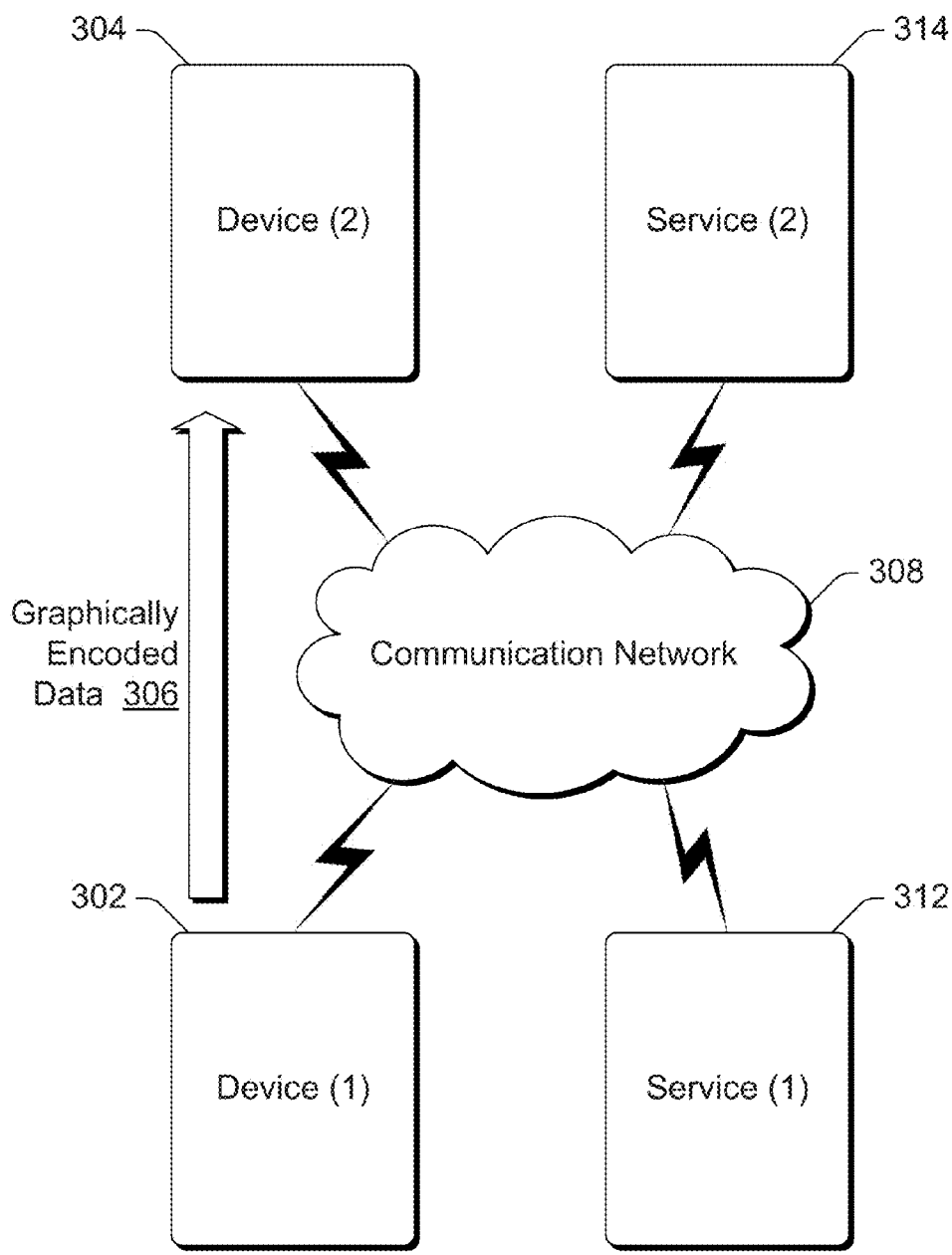
FIG. 3 illustrates another example system implementing the device pairing based on graphically encoded data in accordance with one or more embodiments.

FIG. 3 illustrates another example system 300 implementing the device pairing based on graphically encoded data in accordance with one or more embodiments. System 300 is similar to system 100 of FIG. 1, including a communication network 308 analogous to communication network 108 of FIG. 1, and graphically encoded data 306 analogous to graphically encoded data 106 of FIG. 1.

System 300 also includes devices 302 and 304, which can include at least some of the same functionality as devices 102 and 104 of FIG. 1, respectively. However, system 300 also includes service 312 and service 314. Service 312 is implemented in one or more devices physically separate from (and typically at a remote location from) device 302. Similarly, service 314 is implemented in one or more devices physically separate from (and typically at a remote location from) device 304. Each of services 312 and 314 can be implemented using a variety of different devices, analogous to devices 102 and 104 of FIG. 1.

Service 312 provides support functionality to device 302. One or more of the operations performed by graphical encoding module 118 and/or device pairing module 120 can be performed by service 312 rather than device 302. For example, the secret can be generated by service 312 and provided to device 302, one or both of the address and secret can be graphically encoded by service 312 and provided to device 302, and so forth.

In one or more embodiments, device 302 operates at least in part as a terminal that is controlled by service 312, displaying whatever graphically encoded data is desired by service 312 at the time, verifying that device 304 has knowledge of the secret, and so forth. Accordingly, it is to be appreciated that the address encoded in graphically encoded data 306 can be the address of one or more devices of service 312 rather than an address of device 302. In such situations, although the user of device 304 may be given the impression that he or she is communicating with device 302, the communication is actually with one or more devices of service 312.

Similarly, service 314 provides support functionality to device 304. One or more of the operations performed by graphical encoding module 138 and/or device pairing module 140 can be performed by service 314 rather than device 304. For example, the captured image can be forwarded to service 314, which in turn decodes the graphically encoded data and provides the decoded address and secret to device 304.

In the discussions above, the displayed image includes a graphical encoding of the secret, and the communication initiation request proves that the device that captured the image has knowledge of the secret. This use of the secret assures device 102 that the device from which the communication initiation request is received is indeed a device to which the graphically encoded secret was displayed. However, in situations where such assurance is not desired and/or needed by device 102, the secret need not be used. Rather, graphical encoding module 118 can generate an image for display on screen 112 by graphically encoding the address of device 102. As there is no secret encoded in the image in such situations, no verification of the secret is performed by device pairing module 140.

Using the techniques discussed herein, two devices can be easily paired by a user. For example, a user can press a "device pairing" button of a first device, in response to which the first device displays the image of the graphically encoded address and secret as discussed above. The user then positions the second device so that the displayed image can be captured, and presses a "device pairing" button of the second device to have the second device capture the displayed image. Communication between the two devices is initiated without the need for any additional input by the user. Communication between the two devices can thus be easily initiated, with cumbersome processes for configuring the devices to be able to communicate with one another being avoided.

The device pairing based on graphically encoded data discussed herein supports various usage scenarios. Anywhere communication between two devices is desired, the techniques discussed herein can be used to initiate communication between those two devices. For example, the techniques can be used to initiate communication between two devices to transfer data (e.g., a report, song, or other data from one device to another). By way of another example, the techniques can be used to initiate communication to allow one device to control another (e.g., so images or other files from one device can be displayed on another, so that one device can change the operation of the other, and so forth).

Figure 4:
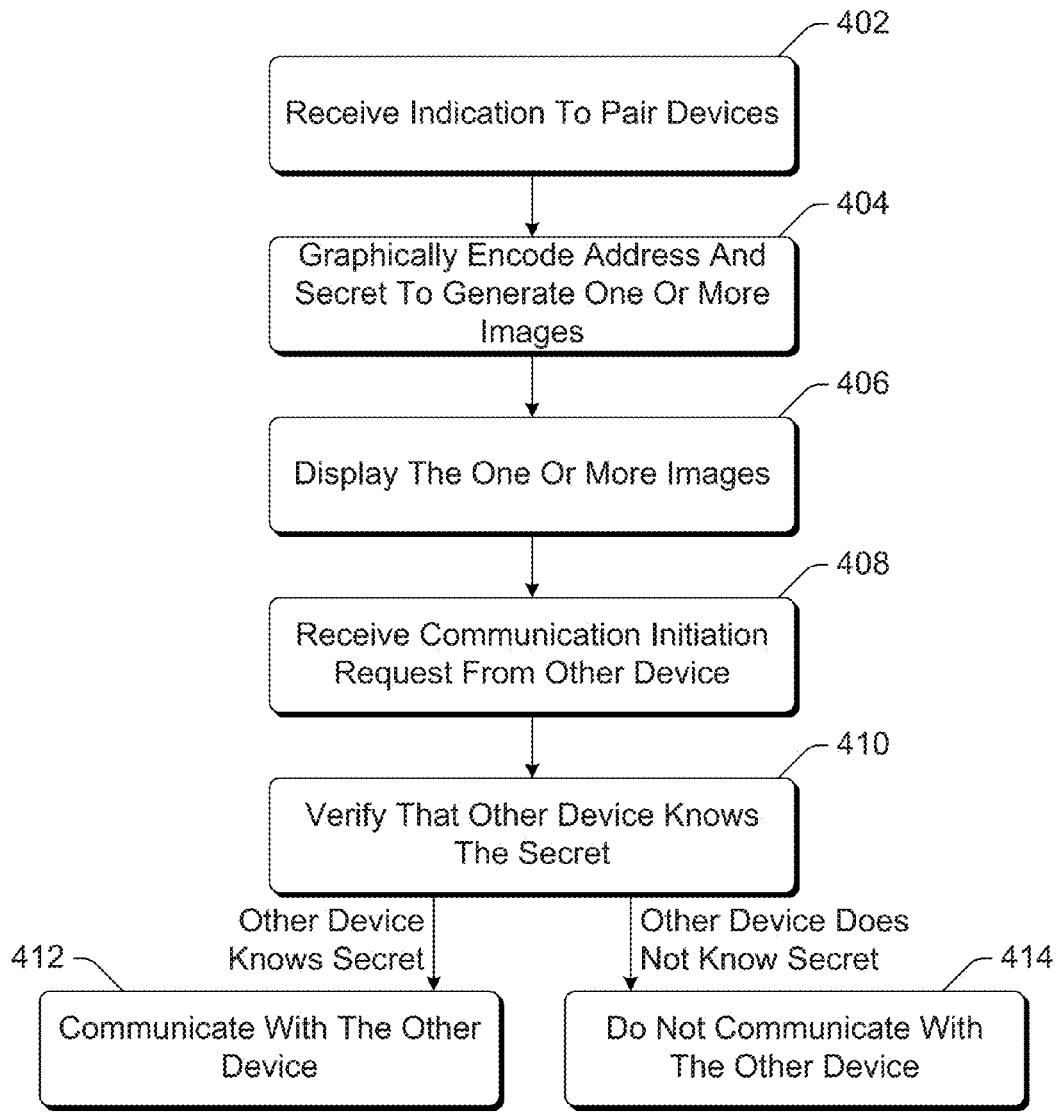
FIG. 4 is a flowchart illustrating an example process for a device implementing the device pairing based on graphically encoded data in accordance with one or more embodiments.

FIG. 4 is a flowchart illustrating an example process 400 for a device implementing the device pairing based on graphically encoded data in accordance with one or more embodiments. Process 400 is carried out by one or more devices, such as device 102 of FIG. 1, or device 302 and/or a device of service 312 of FIG. 3, and can be implemented in software, firmware, hardware, or combinations thereof. Process 400 is illustrated as a set of acts, although the acts need not be performed in the order illustrated in FIG. 4. Process 400 is an example process for device pairing based on graphically encoded data; additional discussions of device pairing based on graphically encoded data are included herein with reference to different figures.

In process 400, an indication to pair devices is received (act 402). This indication can be a user request (e.g., via selection of a button, key or other input via an input module 114). This indication can alternatively be an indication received from another component or module of the device implementing process 400, or from another device.

Both an address of a device and a secret are graphically encoded to generate one or more images (act 404). The device whose address is identified can be the device implementing process 400, or alternatively another device (e.g., a device of a remote service supporting the device implementing process 400). The device whose address is identified is the device responsible for managing the display of information on and/or controlling the operation of the device implementing process 400. The device implementing process 400 can perform the graphical encoding, or alternatively can provide the address and secret to another device or service to perform the graphical encoding.

The one or more images generated in act 404 are displayed (act 406). As discussed above, these images can be displayed on a screen of the device implementing process 400, or alternatively on a screen of a display device receiving signals from the device implementing process 400.

After displaying the one or more images, a communication initiation request is received from another device (act 408). This other device is typically the other device to which the device implementing process 400 is being paired. However, in order to ensure that this is the case, the device implementing process 400 verifies that the device from which the communication initiation request is received knows the secret (act 410). This secret in act 410 is the secret that was graphically encoded in act 404, and this verification can be performed in a variety of different manners as discussed above.

Process 400 then proceeds based on the verification in act 410. If the other device is verified as knowing the secret in act 410, then the device implementing process 400 can proceed with communicating with that other device (act 412).

However, if the other device is not verified as knowing the secret in act 410, then the device implementing process 400 does not proceed with communicating with that other device (act 414). Even though the device implementing process 400 does not proceed with communicating with that other device, it is to be appreciated that subsequent communication initiation requests from that other device can still be received and verified, and subsequent communications allowed if a subsequent communication initiation request is received and verified.

It should be noted that the secret discussed herein can be a variety of different data that can be used by devices 102 and 104 to initiate secure communications using a variety of different encryption and/or secure communication techniques. For example, the secret can be a randomly generated value or string, a value or string generated according to some other rules or criteria, a public key of device 102, a digital certificate (or portion thereof) issued to device 102, and so forth.

Figure 5:
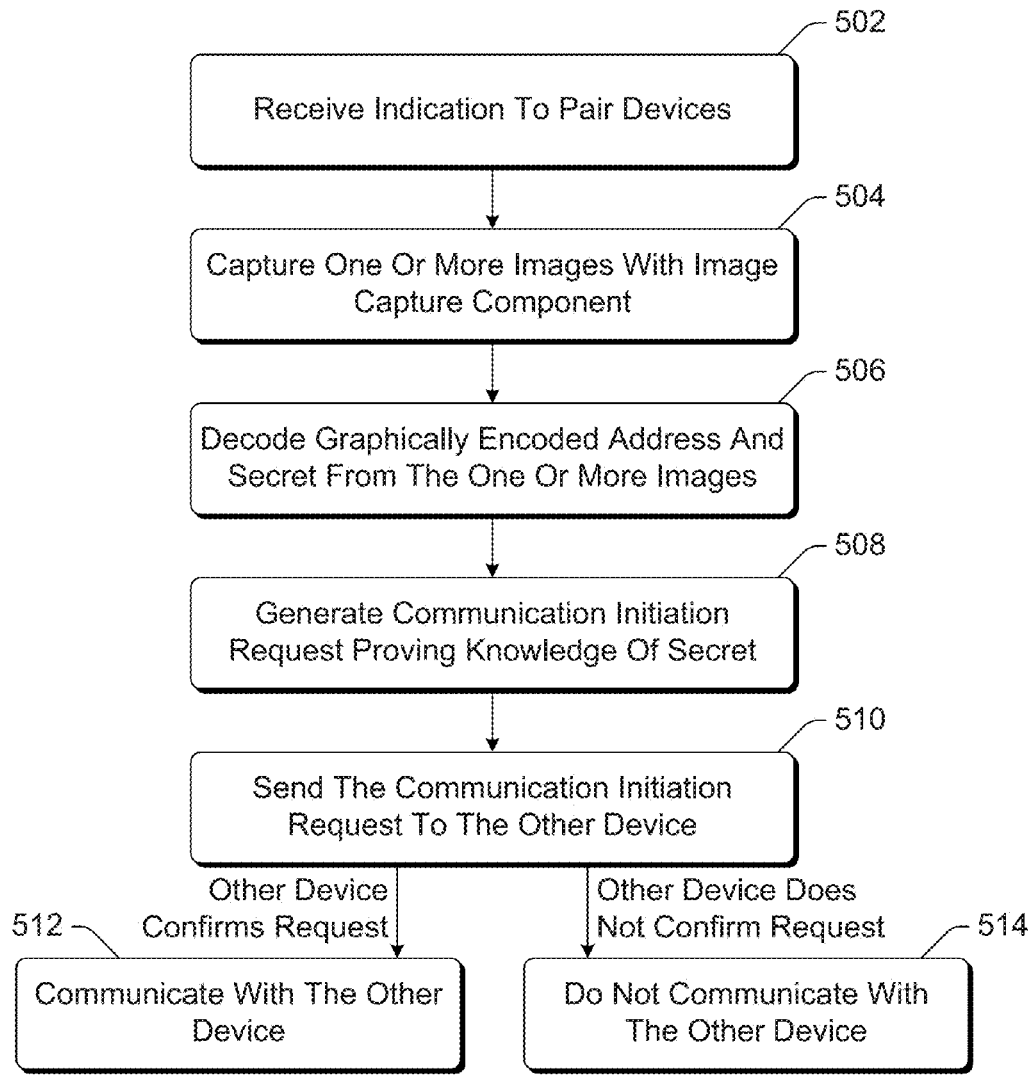
FIG. 5 is a flowchart illustrating another example process for a device implementing the device pairing based on graphically encoded data in accordance with one or more embodiments.

FIG. 5 is a flowchart illustrating another example process 500 for a device implementing the device pairing based on graphically encoded data in accordance with one or more embodiments. Process 500 is carried out by one or more devices, such as device 104 of FIG. 1, or device 304 and/or a device of service 314 of FIG. 3, and can be implemented in software, firmware, hardware, or combinations thereof. Process 500 is illustrated as a set of acts, although the acts need not be performed in the order illustrated in FIG. 5. Process 500 is an example process for device pairing based on graphically encoded data; additional discussions of device pairing based on graphically encoded data are included herein with reference to different figures.

In process 500, an indication to pair devices is received (act 502). This indication can be a user request (e.g., via selection of a button, key or other input via an input module 134). This indication can alternatively be an indication received from another component or module of the device implementing process 500, or from another device.

One or more images are captured with an image capture component of the device implementing process 500 (act 504). These images are the images displayed by the device with which the device implementing process 500 is being paired (e.g., device 102), as discussed above. It should be noted that both the indication can be received in act 502 and the one or more images captured in response to a single user request (e.g., a capture request or selection of a "device pairing" button).

The graphically encoded data from the one or more images is decoded (act 506), resulting in a decoded address and a decoded secret. Based on the decoded address and secret, a communication initiation request is generated (act 508) proving that the device implementing process 500 has knowledge of the secret. This communication initiation request can be generated in a variety of different manners as discussed above.

The communication initiation request is sent to the other device (act 510). This communication initiation request identifies the secret, as discussed above. This other device is the device whose address was graphically encoded in the one or more images captured in act 504. Process 500 then proceeds based on whether the other device confirms the request. If the other device confirms the request, then the device implementing process 500 can continue with communicating with that other device (act 512).

However, if the other device does not confirm the request, then the device implementing process 500 ceases (does not continue with) communicating with that other device (act 514). Even though the device implementing process 500 does not continue communicating with that other device, it is to be appreciated that subsequent indications to pair devices with that other device can be received, and subsequent communication initiation requests sent to that other device (and subsequent communications allowed with that other device if a subsequent communication initiation request is confirmed by that other device).

Figure 6:
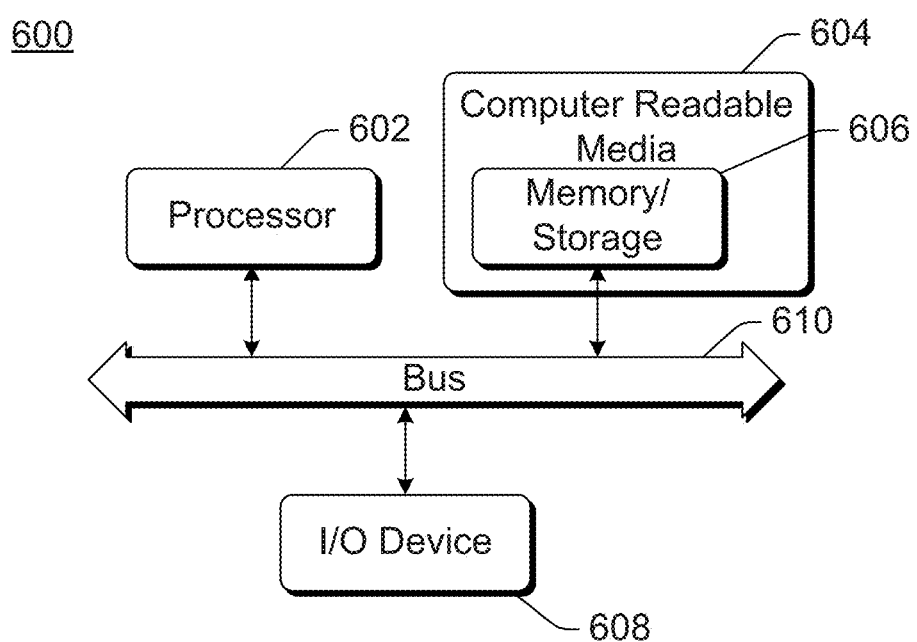
FIG. 6 illustrates an example computing device that can be configured to implement the device pairing based on graphically encoded data in accordance with one or more embodiments.

FIG. 6 illustrates an example computing device 600 that can be configured to implement the device pairing based on graphically encoded data in accordance with one or more embodiments. Computing device 600 can be, for example, device 102 or device 104 of FIG. 1, device 302 or device 304 of FIG. 3, or a device implanting at least part of a service 312 or 314 of FIG. 3.

Computing device 600 includes one or more processors or processing units 602, one or more computer readable media 604 that can include one or more memory and/or storage components 606, one or more input/output (I/O) devices 608, and a bus 610 that allows the various components and devices to communicate with one another. Computer readable media 604 and/or one or more I/O devices 608 can be included as part of, or alternatively may be coupled to, computing device 600. Bus 610 represents one or more of several types of bus structures, including a memory bus or memory controller, a peripheral bus, an accelerated graphics port, a processor or local bus, and so forth using a variety of different bus architectures. Bus 610 can include wired and/or wireless buses.

Memory/storage component 606 represents one or more computer storage media. Component 606 can include volatile media (such as random access memory (RAM)) and/or non-volatile media (such as read only memory (ROM), Flash memory, optical disks, magnetic disks, and so forth). Component 606 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 602. It is to be appreciated that different instructions can be stored in different components of computing device 600, such as in a processing unit 602, in various cache memories of a processing unit 602, in other cache memories of device 600 (not shown), on other computer readable media, and so forth. Additionally, it is to be appreciated that the location where instructions are stored in computing device 600 can change over time.

One or more input/output devices 608 allow a user to enter commands and information to computing device 600, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 6. The features of the device pairing based on graphically encoded data techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented in a first device, the method comprising:
    graphically encoding both an address of the first device and a first secret to generate one or more images that can be displayed by the first device and captured by a second device;
    receiving a communication initiation request from the second device;
    verifying, based on the communication initiation request, that the second device knows the first secret, wherein the verifying is performed at the first device and verification that the second device knows the first secret enables communication with the second device; and
    communicating with the second device only if the second device is verified as knowing the first secret.

2. A method as recited in claim 1, further comprising displaying the one or more images.

3. A method as recited in claim 2, further comprising graphically encoding both the address and the first secret, and displaying the one or more images, in response to a user request to pair the first device with another device.

4. A method as recited in claim 3, wherein the user request is user selection of a device pairing button.

5. A method as recited in claim 1, wherein graphically encoding both the address and the first secret comprises graphically encoding both the address and the first secret across multiple images.

6. A method as recited in claim 1, wherein the address comprises an IP address of the first device.

7. A method as recited in claim 1, further comprising:
    obtaining, from the communication initiation request, a second secret;
    determining whether the second secret is the same as the first secret; and
    wherein verifying that the second device knows the first secret comprises verifying that the second device knows the first secret only if the second secret is the same as the first secret.

8. A method as recited in claim 1, wherein graphically encoding both the address and the first secret comprises graphically encoding both the address and the first secret using a high capacity color barcode.

9. A method as recited in claim 1, wherein the communication initiation request includes an address of the second device, and the method further comprises sending a confirmation indication to the second device indicating receipt of the communication initiation request and verification that the second device knows the first secret.

10. A method as recited in claim 9, wherein the address of the second device comprises an IP address of the second device.

11. One or more computer memory devices having stored thereon instructions that, when executed by one or more processors of a first device, cause the one or more processors to perform operations rising:
    capturing one or more images displayed by a second device;
    sending the one or more images to a remote service that is separate from the first device to decode in lieu of decoding at the first device, from the one or more images, both an address and a secret, wherein the secret is not obtainable from the first device without the one or more images;
    receiving, from the remote service, the address and the secret;

sending a communication initiation request to the address, the communication initiation request identifying the secret, the communication initiation request being verifiable by at least one of the second device or a third device associated with the second device to prove that the first device has knowledge of the secret; and continue communicating with the second device only if a confirmation of the communication initiation request is received.

12. One or more computer memory devices as recited in claim 11, wherein the address is an IP address of the second device.

13. One or more computer memory devices as recited in claim 11, wherein the address is an address of the third device and the third device provides the one or more images to the second device.

14. One or more computer memory devices as recited in claim 11, wherein the communication initiation request includes an address of the first device.

15. One or more computer memory devices as recited in claim 11, wherein each of the one or more images is a high capacity color barcode.

16. One or more computer memory devices as recited in claim 11, wherein capturing the one or more images, sending the one or more images, receiving the address and the secret, and sending the communication initiation request are performed in response to a request to pair the first device with another device.

17. One or more computer memory devices as recited in claim 11, wherein the one or more images comprises multiple images, and wherein to decode both the address and the secret is to decode at least part of the address from a first image of the multiple images, and decode at least part of the secret from a second image of the multiple images.

18. A method implemented in a first device, the method comprising:
    capturing, in response to a user request for device pairing, a high capacity color barcode displayed on a screen of a second device;
    determining which of a plurality of graphical encoding techniques was used to encode the high capacity color barcode;
    decoding, from the high capacity color barcode, both an IP address of the second device and a secret based on the determined technique;
    sending, a communication initiation request to the IP address of the second device, the communication initiation request proving that the first device has knowledge of the secret and being verifiable by the second device that displayed the high capacity color barcode to prove that the first device has knowledge of the secret; and
    if a confirmation of the communication initiation request is received from the second device indicating that the second device has verified the first device has knowledge of the secret, then sending additional communications to the IP address of the second device, otherwise ceasing sending communications to the IP address of the second device.

* * * * *